ethyl)-diethanolamine, N-octyldiethanolamine, N,N-di(n-hexyl)-ethanolamine, N-octadecyl-ethanolamine, N-methyl-isobutanolamine, N-isobutyl-diethanolamine, N-butyl-dipropanolamine, N-cyclohexyl-monopentanolamine, N-ethyl-di-n-hexanolamine, etc. In place of the dinitro-phenols shown in the examples other representative compounds such as 2.4-dinitro-6-benzyl phenol, 2.4-dinitro-6-phenyl-phenol, 2.4-dinitro-6-n-octyl-phenol, 2.4-dinitro-6-cyclopentyl-phenol, 2.4-dinitro-6-chloro-phenol, 2.6-dinitro-4-methyl-phenol, 2.5-dinitro-4-cyclohexyl-phenol, 2.4-dinitro-5-naphthylamino-phenol, 2.4-dinitro-5-orthotoluidino-phenol, and the like may be employed.

The N-hydrocarbon substituted alkanolamine addition salts of dinitro-phenols as set forth in the preceding examples may be used as active toxicants in either spray or dust compositions for the control of plant parasites. While many of these compounds exert a fungicidal action, others have been found particularly well adapted for use in insecticidal compositions.

When employed in dust mixtures, the salts are preferably dispersed in and on solid finely divided inert carriers such as diatomaceous earth, volcanic ash, bentonite, talc, finely divided wood flour, and the like. For dusting purposes compositions comprising from about 0.5 to 5 per cent by weight of the amine salt are particularly useful.

Dispersions of the salts on or in inert carriers may also be employed in water dispersions as agricultural sprays for dormant or summer application or as eradicant fungicides. In preparing dust mixtures for use in such aqueous compositions, the amine salts may be employed in amounts up to 50 per cent by weight of the finely divided solid concentrate, although from 15 to 25 per cent by weight is preferred. Similarly aqueous solutions or dispersions of the amine salts are useful in parasite control.

Various wetting, sticking and dispersing agents such as glyceryl oleate, alkali metal caseinate, aluminum naphthenate, alkali metal salts of sulfonated aromatic hydrocarbons and phenols, sodium lauryl sulfate, partially neutralized sulfuric acid derivatives of fatty acids and oils, blood albumen, soap, and the like may be employed in combination with the new amine salts. Similarly, the amine salts can be combined with other insecticidal and fungicidal agents such as petroleum, fish and vegetable oils, lead arsenate, sulfur, copper sprays, and the like for the control of various insect and fungous pests.

Results representative of those obtainable with this class of compounds were observed with the N-cyclohexyl-substituted ethanolamine salts of 2.4-dinitro-6-cyclohexyl-phenol. A composition comprising 0.06 gram of N,N-di-(cyclohexyl)-ethanolamine salt, 3 milliliters of a commercial miscible petroleum oil and 97 milliliters of water was found to give a control of 98 per cent against the eggs of L. Kalmii Stal. A similar composition in which the N-cyclohexylmonoethanolamine salt of 2.4-dinitro-6-cyclohexyl-phenol was employed, gave a control against the eggs of L. Kalmii Stal. of 91.6 per cent.

The N-hydrocarbon-substituted alkanolamine salts are also valuable as stomach and contact poisons. In one such application 7 parts by weight of the N-butyl-diethanolamine salt of 2.4-dinitro-6-ethyl-phenol was intimately mixed with 22 parts of sodium lauryl sulfate. Sufficient of this composition was then dispersed in water to give a concentration of the amine salt equivalent to 0.5 pounds per 100 gallons of the spray composition. This material was applied for the control of potato beetle larvae and found to give a control of 61.8 per cent in 2 days.

The amine salt compounds as set forth in the foregoing examples and description may be properly identified by the following structural formula:

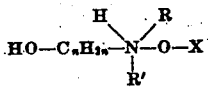

wherein R represents alkyl, cycloalkyl, or aralkyl, R' represents hydrogen, alkyl, cycloalkyl, aralkyl, or hydroxyalkyl, $n$ is an integer greater than one, and —O—X represents an aromaticoxy radical of the benzene series characterized by having the oxygen directly attached to the benzene nucleus and by a total of two nitro groups one attached in the para position and the other in one of the positions ortho to the carbon-oxygen linkage. Similarly, preferred embodiments of the invention consisting of subgeneric groups of salts obtained by reacting N-hydrocarbon-substituted alkanolamines with particular 2.4-dinitro-phenols may be characterized by substituting for "—O—X" in the foregoing formula such structural designations as

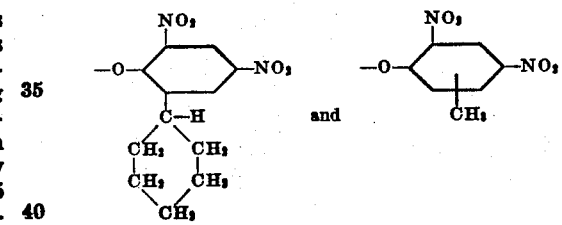

We claim:

1. An N-hydrocarbon-substituted alkanolamine salt having the formula

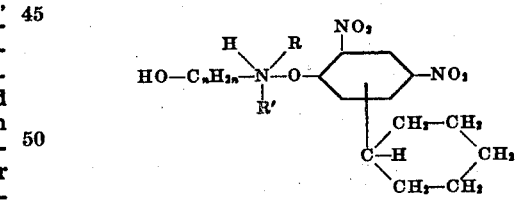

wherein R represents a member of the group consisting of alkyl, cycloalkyl, and aralkyl radicals, R' represents a member of the group consisting of hydrogen and the alkyl, cycloalkyl, aralkyl, and HO—$C_nH_{2n}$ radicals, and $n$ is an integer from 2 to 6 inclusive.

2. An N-hydrocarbon-substituted alkanolamine salt having the formula

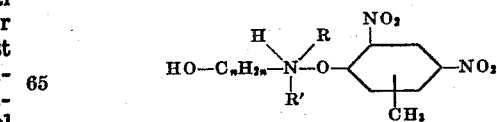

wherein R represents a member of the group consisting of alkyl, cycloalkyl, and aralkyl radicals, R' represents a member of the group consisting of hydrogen and the alkyl, cycloalkyl, aralkyl, and HO—$C_nH_{2n}$ radicals, and $n$ is an integer from 2 to 6 inclusive.

3. A parasiticidal composition comprising as a toxic ingredient an addition salt of a dinitro-phenol and an N-hydrocarbon-substituted alkanolamine having the formula

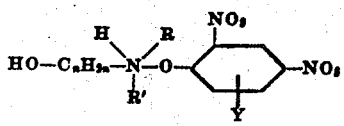

wherein R represents a member of the group consisting of alkyl, cycloalkyl and aralkyl radicals, R' represents a member of the group consisting of hydrogen and alkyl, cycloalkyl, aralkyl, and $HO-C_nH_{2n}$ radicals, $n$ is an integer from 2 to 6 inclusive, and Y is a hydrocarbon radical selected from the group consisting of aryl, cycloalkyl, aralkyl, and alkyl radicals.

4. The N-ethyl-diethanolamine salt of 2.4-dinitro-6-cyclohexyl-phenol, melting at 84°–86° C.

5. The N-cyclohexyl-monoethanolamine salt of 2.4-dinitro-6-cyclohexyl-phenol, melting at 132°–135° C.

6. The N,N-dibutyl-ethanolamine salt of 2.4-dinitro-6-methyl-phenol, melting at 59°–60° C.

GERALD H. COLEMAN.
FRANK B. SMITH.

Oct. 2, 1945.　　　　　J. M. CROM　　　　　2,385,796
METHOD OF AND APPARATUS FOR TENSIONING WIRE IN BANDING OPERATIONS
Filed March 20, 1944　　　　2 Sheets-Sheet 1
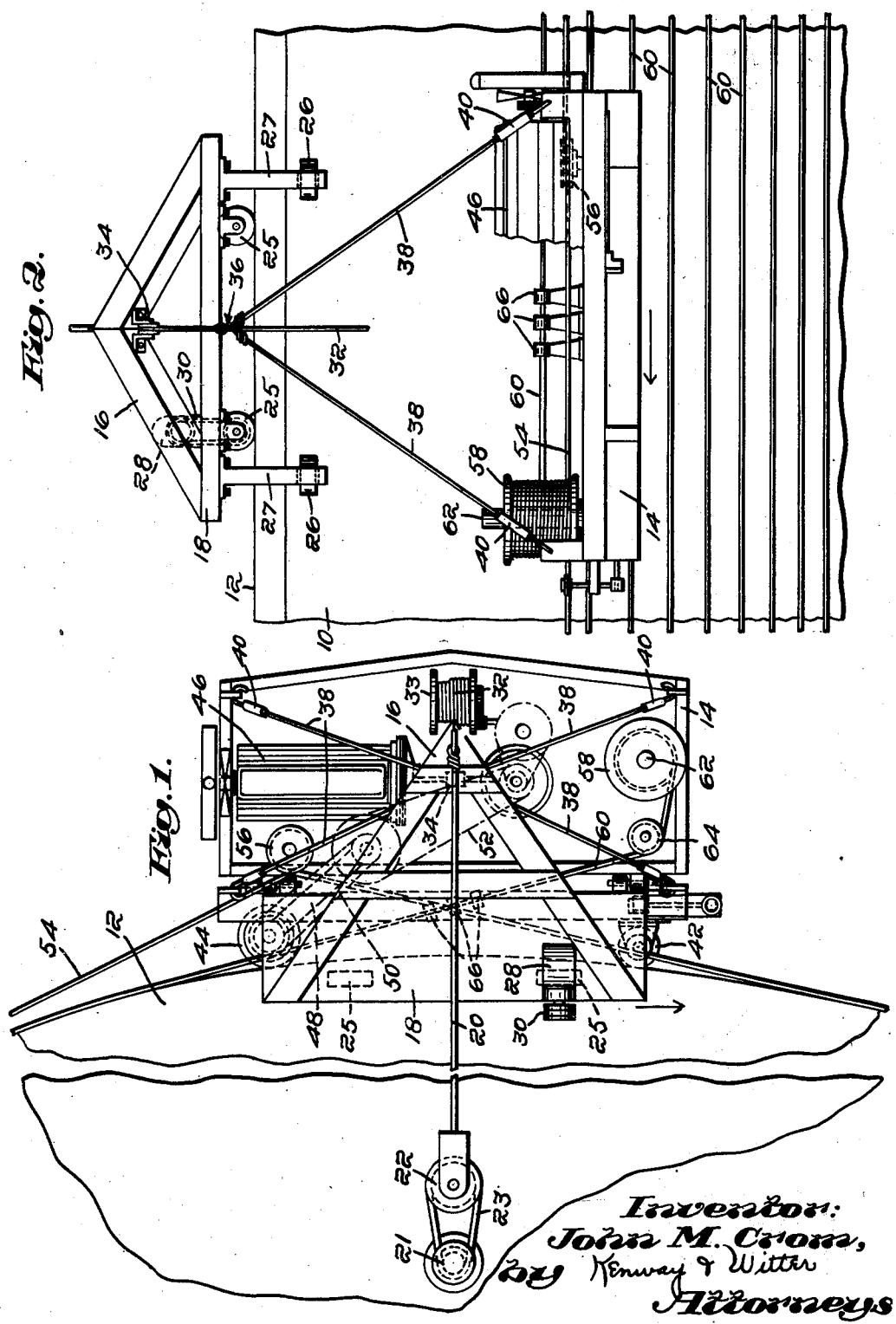
Inventor:
John M. Crom,
by Kenway & Witter
Attorneys